(12) United States Patent
Abdoulin

(10) Patent No.: US 6,788,039 B2
(45) Date of Patent: Sep. 7, 2004

(54) LOW POWER INDUCTORLESS DC-DC REGULATOR WITH CAPACITIVE CHARGING/DISCHARGING

(75) Inventor: Edgar Abdoulin, Woodland Hills, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/706,893

(22) Filed: Nov. 13, 2003

(65) Prior Publication Data

US 2004/0140792 A1 Jul. 22, 2004

Related U.S. Application Data

(60) Provisional application No. 60/426,281, filed on Nov. 14, 2002, and provisional application No. 60/434,931, filed on Dec. 19, 2002.

(51) Int. Cl.[7] .............................................. G05F 1/611
(52) U.S. Cl. ....................................... 323/288; 323/224
(58) Field of Search ................................ 323/288, 224, 323/282

(56) References Cited

U.S. PATENT DOCUMENTS

| 4,288,738 A | * | 9/1981 | Rogers et al. | ............... 323/271 |
| 6,369,558 B2 | * | 4/2002 | Umemoto | ................... 323/282 |

* cited by examiner

*Primary Examiner*—Shawn Riley
(74) *Attorney, Agent, or Firm*—Ostrolenk, Faber, Gerb & Soffen, LLP

(57) ABSTRACT

A non-isolated switched-capacitor converter. The output voltage is either fixed or adjustable. A control IC controls first and second semiconductor switches. The converter includes a first diode and a second diode connected in series, the diodes being connected in parallel with the output circuit; the first and second semiconductor switches connected in series; and a flying capacitance connected to the diode junction point. The load capacitance may be charged via the flying capacitance and the second diode in a charge cycle; and the load capacitance may be discharged via the first diode and the flying capacitance in a discharge cycle. The control IC has a high side well powered by the input supply voltage which drives the first semiconductor switch; a floating well powered by the flying capacitor which drives the second semiconductor switch; and a control circuit powered by an output voltage.

37 Claims, 25 Drawing Sheets

Charge Cycle

Discharge Cycle

Charge Cycle            Discharge Cycle

Figure 12 – Verification of operating range
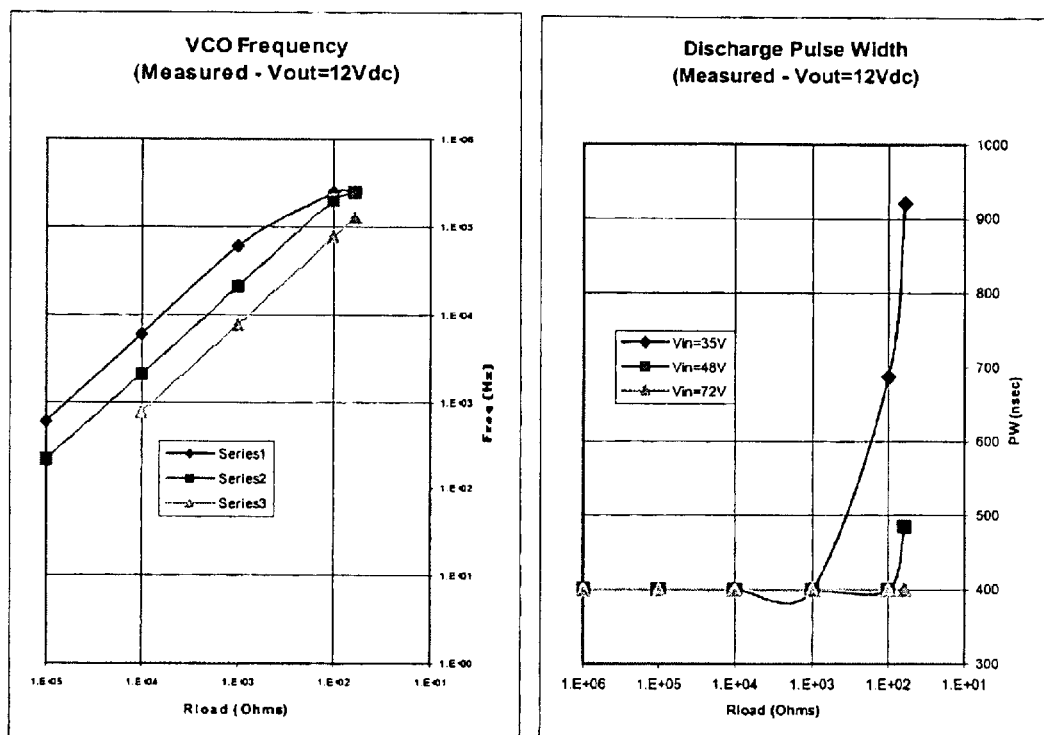

BIAS IC Waveforms

CH2: M1 drive
CH4: M2 drive
CH1: Output voltage

BIAS IC Waveforms
(Expanded)

CH2: M1 Drive
CH4: M2 Drive
CH1: Output voltage

BIAS IC Waveforms

CH2: M1 Drive
CH4: M2 Drive
CH3: Input current
(10mA/div)

LOW POWER INDUCTORLESS DC-DC REGULATOR WITH CAPACITIVE CHARGING/DISCHARGING

CROSS-REFERENCE TO RELATED APPLICATIONS

This application is based upon and claims priority of the inventor's U.S. Provisional Applications Serial No. 60/426,281 filed Nov. 14, 2002; and Serial No. 60/434,931 filed Dec. 19, 2002, both incorporated by reference.

BACKGROUND OF THE INVENTION

1. Field of the Invention

The invention relates to a low-power DC-DC converter, and more particularly to a switched-capacitor DC-DC converter using one or two MOSFETS and not requiring inductive isolation.

2. Related Art

Challenges in designing high-efficiency auxiliary bias supplies

Auxiliary, low power, bias supplies are a necessity in all types of systems to provide local power for system controllers. In low input voltage systems, linear regulators and Zener/resistor combinations have been traditionally used for power conversion and, to this date, play a major role. High input voltages have always posed a major problem for linear regulators due to excessive losses generated by the linear regulators, rendering them undesirable.

In view of the growing need for local power, with the addition of safety, supervisory and regulatory concerns, designers have been forced to use more efficient methods to generate local power from high voltage sources.

Step down, inductor/transformer based, switching regulators offer a substantially more efficient conversion process over a higher/wider range of input voltages. Buck regulators have been used quite successfully in medium voltage applications, National Semiconductor's "SIMPLE SWITCHER® being a good example. One drawback of switching regulators is their tendency to generate EMI noise, which needs to be reduced by using proper input EMI filters, at an added cost. At even higher input voltages (such as off-line applications or systems with a PFC input stage), the buck regulator requires a fairly large inductor (10~20 mH) to limit the peak input current and reduce EMI, which can render it quite costly; conversely, the switching frequency can be increased to reduce the inductor requirement, at the expense of greater losses.

The fly-back converter is a good choice for high voltage applications, but by definition, requires an isolation transformer/inductor which not only adds to the overall system cost but is not always desired or required for local auxiliary supplies. Power Integration's TINYSWITCH® and Maxim's MAX5014® are good examples. Other proprietary controllers like the UC3889 attempt to address this issue by eliminating the transformer at the expense of an additional (and fairly large) inductor. Fly-back converters do not offer any substantial improvements with respect to EMI over buck converters.

Other solutions for auxiliary supplies in switching converters use an extra winding off the main transformer followed by a low pass filter and a Zener diode. Although this scheme is adequate for low power, and is widely used to power single controllers on the primary side, the requirement for an additional winding might not always be practical, or cost effective.

A low power auxiliary supply controller should provide as many of the following features as possible:

Low cost to allow replication within the system

Low power consumption for good efficiency. At low output power, controller losses will significantly impact overall efficiency.

Low EMI

Fairly good line/load regulation and no-load/short circuit protection

Ease of design-in.

Switched capacitor converters offer several advantages including low cost and inductor-less operation. It would be desirable to provide a switched capacitor converter that addresses the requirements for a low cost auxiliary supply controller.

Switched capacitor DC-DC converter basics

Switched capacitor (charge pump) DC-DC converters have been extensively used for positive to negative conversion of dc voltages (ICL766X, LTC660 . . . etc) as well as voltage doubling and buck/boost, integrated power converters. High efficiency switched capacitor converters traditionally have been limited to low input voltages (battery voltage conversion) and require high frequencies of operation. (LTC1911, LTC3250). At high input voltages, switched capacitor converters suffer from the following drawbacks:

High input peak currents at low operating frequencies.

Low efficiency at low operating frequencies. (<1 MHz)

Low efficiency if input to output voltage differential is high.

A basic switched capacitor converter and its equivalent circuit are shown in FIG. 1. Switch SW1 is thrown from A to B at a rate determined by frequency f, thereby charging C1 to the input voltage Vin and discharging it into the load capacitance C2. In FIG. 1:

$Req = 1/C1*freq$ $I = (Vin-Vout)/Req$ $Eloss = C1(Vin^2 - Vout^2)/2$ $Ipeak = (Vin-Vout)/Rsw$, where Rsw is the ON resistance of the switch This conversion process will yield high efficiencies if input to output differential is small (Vin≈Vout). Also, high peak currents are avoided if input to output differential is small, contributing to reduced EMI.

A more efficient method is to use series charge and parallel discharge (equivalent circuits are shown FIG. 2). This method has the advantage of lower input peak current due to lower voltage differential at charge time (and also lower EMI) and is used for multi-stage integrated on-chip converters.

For high voltage discrete circuitry, it is desirable to reduce the number of external switches. FIG. 3 shows such an implementation. In a charge cycle, capacitors CF and CL are charged via switches SW1 and SW3, and switches SW2 and SW4 are OFF. In a discharge cycle, switches SW1 and SW3 are OFF, and capacitors CF and CL discharge to ground through switches SW2 and SW4.

SUMMARY OF THE INVENTION

A switched capacitor converter is presented as a low cost alternative to auxiliary supplies using buck or fly-back topologies in applications not requiring isolation. The system can operate over a wide range of input voltages up to 600 Vdc by proper selection of external components. Both fixed and variable output voltage versions are possible. The controller is designed to reduce EMI and provide an efficiency in the range of 70%.

According to a first aspect of the invention, a switched-capacitor converter may comprise a supply voltage input for receiving a supply voltage; an output circuit comprising a load resistance and a load capacitance connected in parallel; a diode circuit comprising a first diode and a second diode connected in series at a diode junction point, said diode circuit being connected in parallel with said output circuit; first and second semiconductor switches connected in series at a switch junction point; said semiconductor switches being connected between said supply voltage input and said output circuit; and a flying capacitance connected between said switch junction point and said diode junction point; wherein said load capacitance is charged via said flying capacitance and said second diode when said first switch is ON and said second switch is OFF, and said load capacitance is discharged via said first diode and said flying capacitance when said first switch is OFF and said second switch is ON. Each said semiconductor switch may include a p-channel device or an n-channel device. A current limiting component may be provided in series with at least one of said first diode, said flying capacitor, said second switch and said output circuit. The current limiting component may be an inductance and may be disposed between said first diode and said diode junction point.

According to a second aspect of the invention, a control IC for controlling said first and second semiconductor switches may comprise a high side well powered by said input supply voltage and including a first driver circuit connected for driving said first semiconductor switch; a floating well powered by said flying capacitor and including a second driver circuit connected for driving said second semiconductor switch; and a control circuit powered by an output voltage across said output circuit. Advantageously, at a start-up time, said control circuit charges said load capacitance to a predetermined initial voltage. It may control said first semiconductor switch to charge said flying capacitance and thereby charge said load capacitance to said predetermined initial voltage. Also advantageously, said control circuit delivers a variable amount of charge to said load capacitance per unit time. Said control circuit may increase a discharge frequency in response to an increase in load power demand, and maintain a predetermined fixed discharge time. Also, when said discharge frequency reaches a predetermined maximum, the control circuit maintains said maximum frequency and increases the discharge time in response to an increase in load power demand.

According to a third aspect of the invention, a switched-capacitor converter may comprise a supply voltage input for receiving a supply voltage; an output circuit comprising a load resistance and a load capacitance connected in parallel; a diode circuit comprising a first diode and a second diode connected in series at a diode junction point, said diode circuit being connected in parallel with said output circuit; first and second semiconductor switches connected in series at a switch junction point; said semiconductor switches being connected between said supply voltage input and said output circuit; and a flying capacitance connected across said second semiconductor switch and to said diode junction point; wherein said load capacitance is charged via said flying capacitance and said second diode when said first switch is ON and said second switch is OFF, and said load capacitance is discharged via said first diode and said flying capacitance when said first switch is OFF and said second switch is ON. Said first and second semiconductor switches may be interconnected by a third diode, said flying capacitor being connected to said diode connection point of said first and second diodes, and to a connection point between said third diode and said second semiconductor switch. Also, said first and second semiconductor switches may be connected to each other directly.

Other features and advantages of the present invention will become apparent from the following description of embodiments of the invention which refers to the accompanying drawings.

BRIEF DESCRIPTION OF THE DRAWINGS

FIG. 5b is a block diagram of the control IC of FIG. 5a.

FIG. 11b is a schematic diagram of a first practical circuit corresponding to the embodiment of FIG. 5a.

FIG. 12 shows graphs of frequency and pulse width versus load resistance for various input voltages.

FIG. 14a is a schematic diagram of a second practical circuit corresponding to the embodiment of FIG. 5a.

FIG. 14b is a bar graph showing loss components in the circuit of FIG. 14a.

FIGS. 15a and 15b are graphs of gate voltage and output voltage in the circuit of FIG. 14a.

FIG. 15c is a graph showing gate voltage and input current in the circuit of FIG. 14a.

DETAILED DESCRIPTION OF EMBODIMENTS OF THE INVENTION

Figure 1:
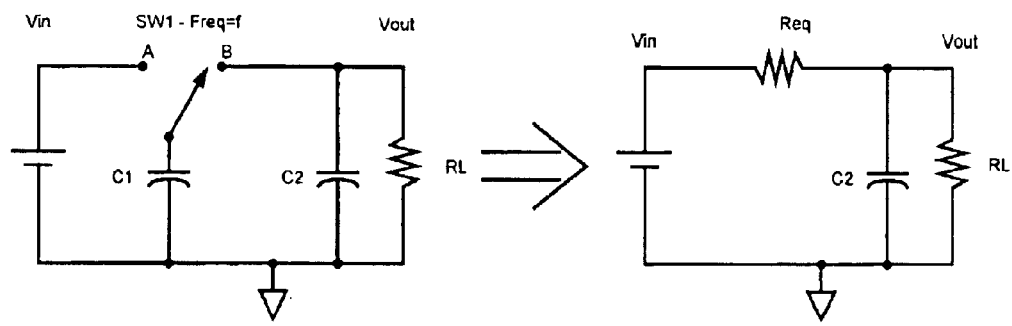
FIG. 1 is a schematic diagram of a basic known switched capacitor converter.
Figure 2:
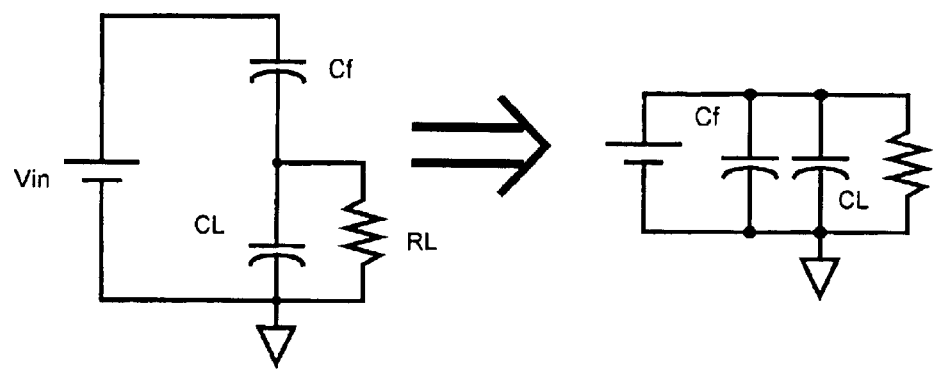
FIG. 2 is a schematic diagram of another known switched capacitor converter.
Figure 3:
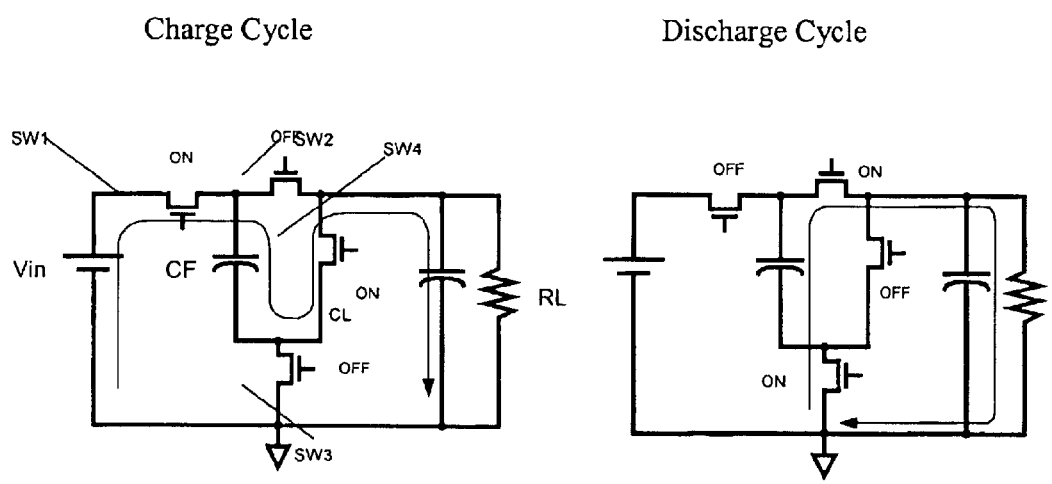
FIG. 3 is a schematic diagram of a third known switched capacitor converter.
Figure 4:
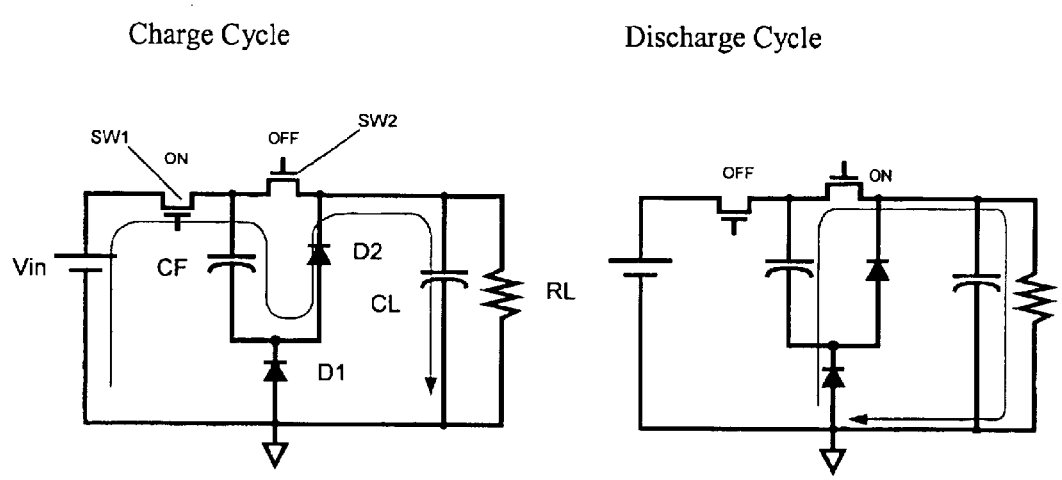
FIG. 4 is a schematic diagram of a switched-capacitor converter according to a first embodiment of the invention.

Careful consideration of the circuit in FIG. 3 reveals that two of the switches (SW3 and SW4) can be effectively replaced by diodes D1 and D2, as shown in FIG. 4. Individual switch states and resulting current paths during charge and discharge are shown by the arrows in FIG. 4.

Figure 5A:
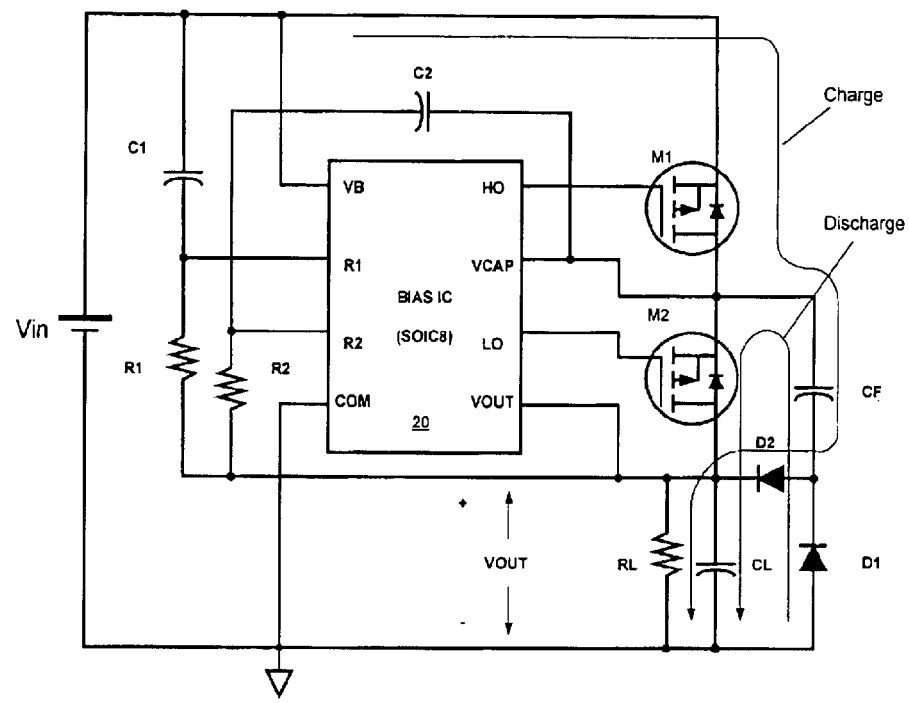
FIG. 5a is a block diagram of the embodiment of FIG. 4, including a control IC.
Figure 5B:
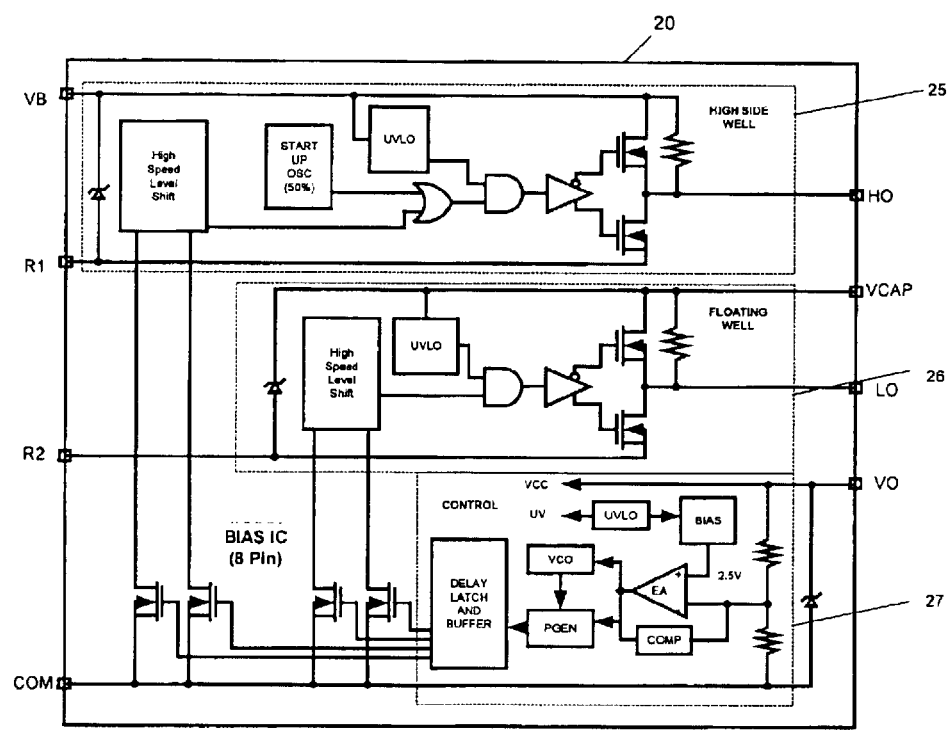

With this modification, a basic IC bias supply with control IC 20, p-channel MOSFETs M1, M2, and its block diagram, are shown in FIGS. 5a and 5b, respectively. The MOSFETs may be HEXFET-brand MOSFETs manufactured by the International Rectifier Corporation.

As shown in FIGS. 5a and 5b, two high voltage isolated wells (high side well 25 and floating well 26) are included to provide the necessary gate drives HO and LO to the two external switches M1 and M2, respectively. The high side well 25 is biased through resistor R1 and is fixed to the input voltage rail Vin. The floating well 26 is powered from the flying capacitor CF through R2 and moves up or down (in voltage) with it, and as such, is protected against dv/dt. The low side includes control circuitry 27 to generate the signals driving the two external P-channel HEXFETs and is powered directly from the regulated output voltage VO. The load capacitor (CL) is generally provided by the sum of all capacitances in the powered circuit and need not be a separate component.

Startup Considerations

The control circuitry 27 in the low side requires a minimum voltage of for example 8 Vdc to operate properly. At start up, the load capacitor CL has to be charged to this minimum voltage to enable the control.

Since there is no direct DC path to charge the load capacitance at time zero, choice of the flying cap ($C_F$) becomes important to ensure a proper startup of the circuit. After the establishment of a proper voltage in the high side well 25 (through R1 and detection by high side UVLO), switch M1 is turned on (or on/off continuously) to charge the load capacitance CL. After the system starts up, control of the switches is passed on to the low side.

Figure 6:
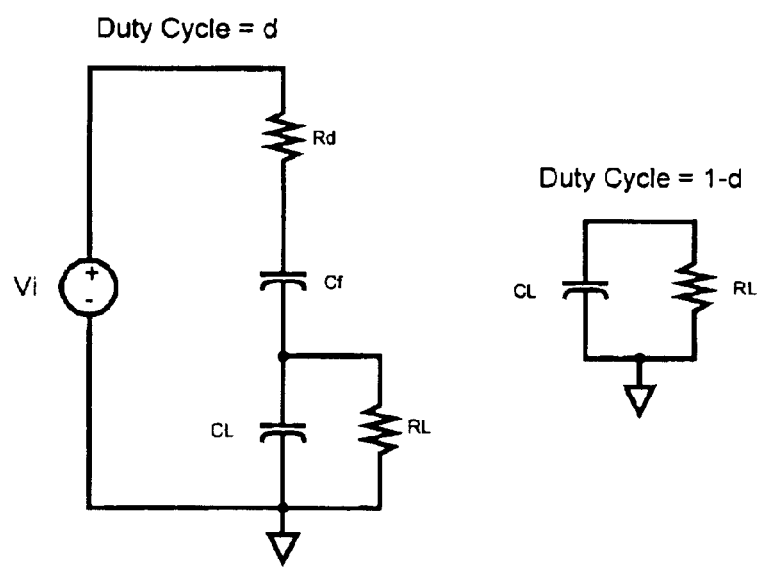
FIG. 6 is an equivalent circuit corresponding to a startup operation in the converter of FIG. 4.

The equivalent circuit for the startup operation is shown in FIG. 6.

The state space equations for the equivalent circuit are shown below when switch M1 is turned on continuously:

$$dv_f/dt = -(1/C_F R_d) \cdot v_f - (1/C_F R_d) \cdot v_L + (1/C_F R_d) \cdot V_{in} \quad (1)$$

and $$dv_L/dt = -(1/C_L R_d) \cdot v_f - [(R_d + R_L)/(R_d \cdot R_L \cdot C_L)] \cdot v_L + (1/R_d \cdot C_L) \cdot V_{in} \quad (2)$$

Solving for VL yields:

$$v_L(t) = (V_L/C_L \cdot R_d) \cdot (S1 \cdot e^{S1 \cdot t} - S2 \cdot e^{S2 \cdot t})/(S1-S2), \quad (3)$$

where S1 and S2 are the roots of the Laplace transformed equations. The resulting equation for VL shows a peak voltage at:

$$t_{max} = [1/(S1-S2)] \cdot Ln(S1/S2) \quad (4)$$

Figure 7:
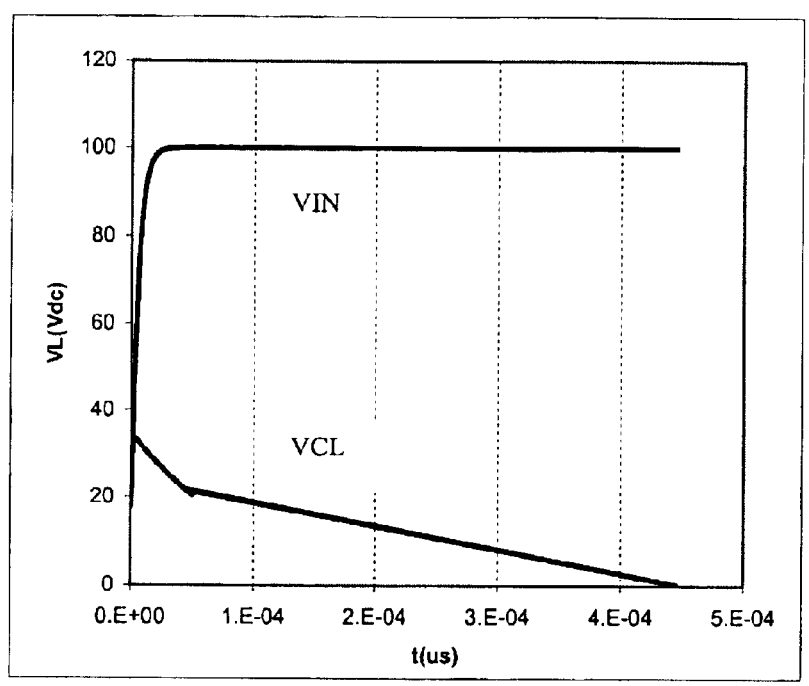
FIG. 7 is a graph of load voltage versus load capacitance.

The voltage VL on the load capacitance CL is shown in FIG. 7. The choice for $C_f$ has to ensure this peak voltage is well above the undervoltage lockout UVLO of the low side for proper start-up. Similar equations can be written for the case when switch M1 is turned on and off with a duty cycle d, in which case, the state space averaged equations will have to be used. As will be understood by those skilled in the art, the state space averaged equations are related to those presented above. However, two equations are used, one for the time interval "d" and another for the time interval "1-d". The two equations are then averaged to yield the solution.

Figure 8A:
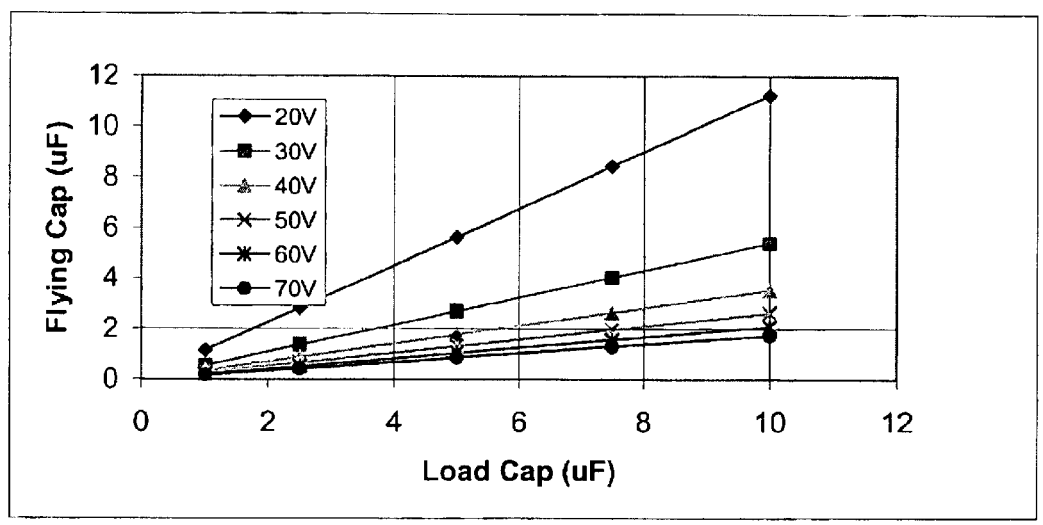
FIG. 8a is a graph including curves of flying capacitance versus load capacitance for various supply voltages.
Figure 8B:
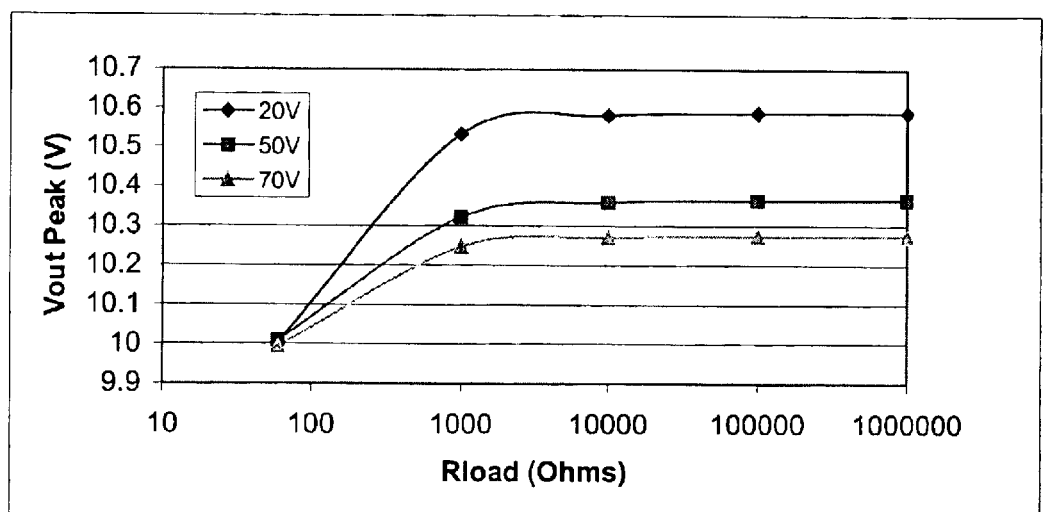
FIG. 8b is a graph including curves of output voltage versus load resistance for various supply voltages.

The state equations in (1) can be used to generate a set of curves for different operating conditions (i.e. minimum Vin, and minimum load resistance) to calculate the minimum capacitance required for $C_F$. One such set of curves is shown in FIG. 8a. These curves were generated for a supply voltage of 20~70 Vdc with varying values of load capacitance. By knowing the maximum load capacitance, the curves can be used to calculate the minimum value for $C_F$ at the minimum expected Vin. FIG. 8b shows variation of the startup voltage with load resistance. This is important since at startup there might not be a well defined load on the system. The curves show that for a correct value of $C_F$ obtained from the curves in FIG. 8a, the system will start up as long as the load resistance does not decrease below the minimum used to calculate $C_F$.

Control Method

The principal aim of the control circuitry 27 is to maintain a constant voltage across the load under varying line and load conditions. Furthermore, the control circuitry has to accomplish this task by avoiding large input peak currents to reduce EMI while maintaining an acceptable level of conversion efficiency.

In capacitive charge/discharge systems, reduced EMI requires that the input to output differential during the charge cycle be relatively low, which prevents the flying capacitor from discharging into the output capacitor completely. This points to a very small discharge cycle time. But varying load conditions require varying values of charge to be delivered to the load per unit time. Combining the two requirements, a scheme combining a variable frequency with a fixed discharge time was used as the primary control scheme.

The requirement of low controller losses dictates that the frequency of operation be limited, since higher frequencies will increase the power requirements in the high side well 25 and floating well 26 to drive M1 and M2 (freq.Qg.Vg losses) forcing R1 and R2 to lower values (more current drain from Vin, i.e. less efficiency). With a 250 KHz limit on frequency, there might be situations (specifically at startup where the output capacitor is completely discharged) where the proper amount of charge will not be delivered to the output to maintain the voltage. In this case, the discharge time will have to be increased.

Considering the two requirements, the final control methodology then becomes:

Primary control scheme: Maintain a fixed discharge time of 400 nsec and increase frequency when load demands more power.

Secondary control scheme: When frequency reaches its maximum (250 KHz) maintain the maximum frequency and increase discharge time if load demands more power.

Figure 9:
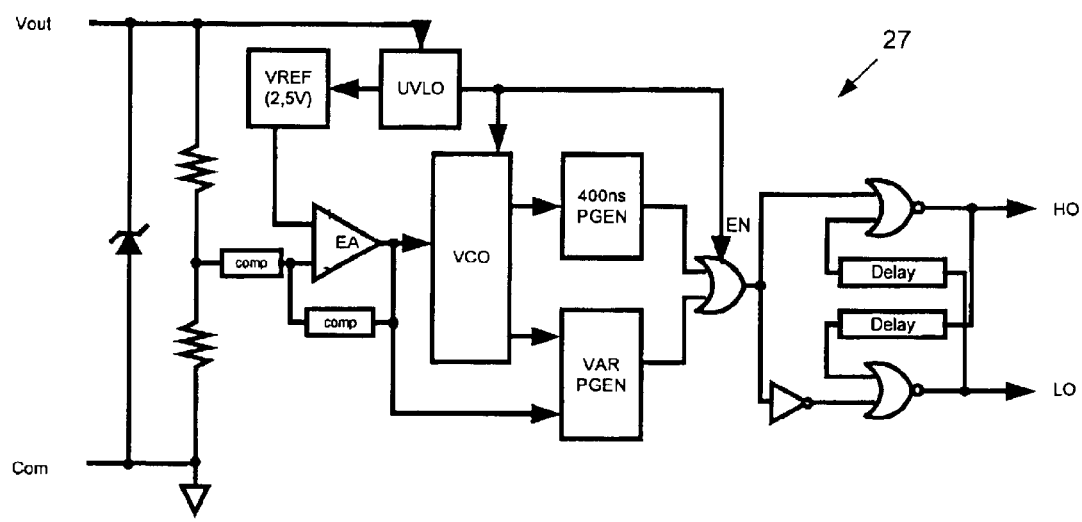
FIG. 9 is a more detailed block diagram of the bias control section 27 of the control IC shown in FIG. 5b.

A block diagram of the bias IC control section 27 is shown in FIG. 9. The error amplifier EA compares the output voltage with an internal reference VREF. The error output drives a VCO with a maximum frequency of 250 KHz. The output of the VCO drives a pulse generator PGEN which determines the minimum discharge pulse width and a variable pulse generator VAR PGEN which generates a wider pulse than the standard minimum one when the output of the error amplifier exceeds a predetermined threshold. The two pulse generator outputs are OR'd and passed through a delayed latch to produce the final drives HO and LO for M1 and M2.

Figure 10:
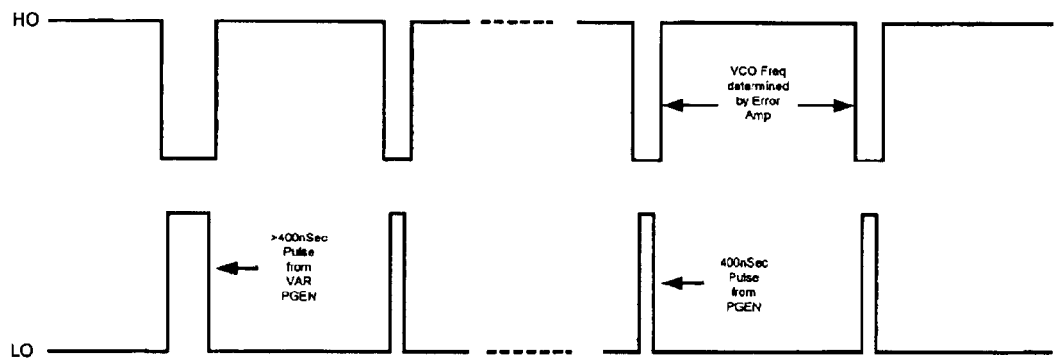
FIG. 10 shows pulse timing in the circuit of FIG. 9.

FIG. 10 shows the timing diagram for the output pulses.

Ideally, the discharge time should be small to prevent complete discharge of the flying capacitor. Minimum discharge time is dictated by practical considerations, e.g. process capability, repeatability and external switch on/off time for a given gate driver size. For a driver with a source/sink capability of 250 mA max, a discharge time of ~400 nsec was found to yield controllable and repeatable results. To prevent shoot-through, the control circuitry also adds dead time on the order of 100 nsec to each pulse controlling M1 and M2. At 400 nsec, the flying capacitor has ample time to completely discharge into the load capacitor. Therefore, to prevent large current spikes during the discharge time and avoid losses in M2, a small amount of inductance (or resistance, if efficiency is not the primary goal) can be used as an in-rush current limiter in the discharge loop. The effect of this inductance is to prevent the complete discharge of the flying capacitor, at the expense of slightly higher frequency of operation. An inductance value of 10~50 μH (for example a small surface mount inductor) has been found to be adequate for this purpose. The inductor type and size are chosen such that it can conduct the maximum peak current without saturating.

Figure 11A:
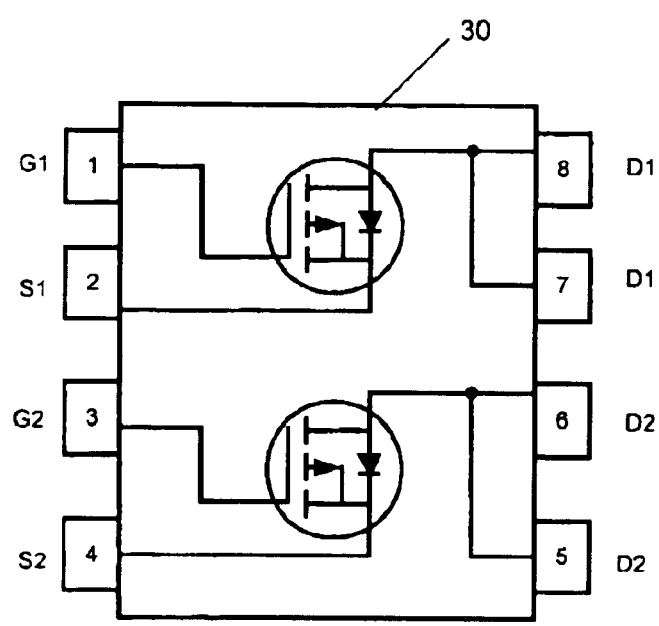
FIG. 11a is a block diagram of a HEXFET assembly.
Figure 11B:
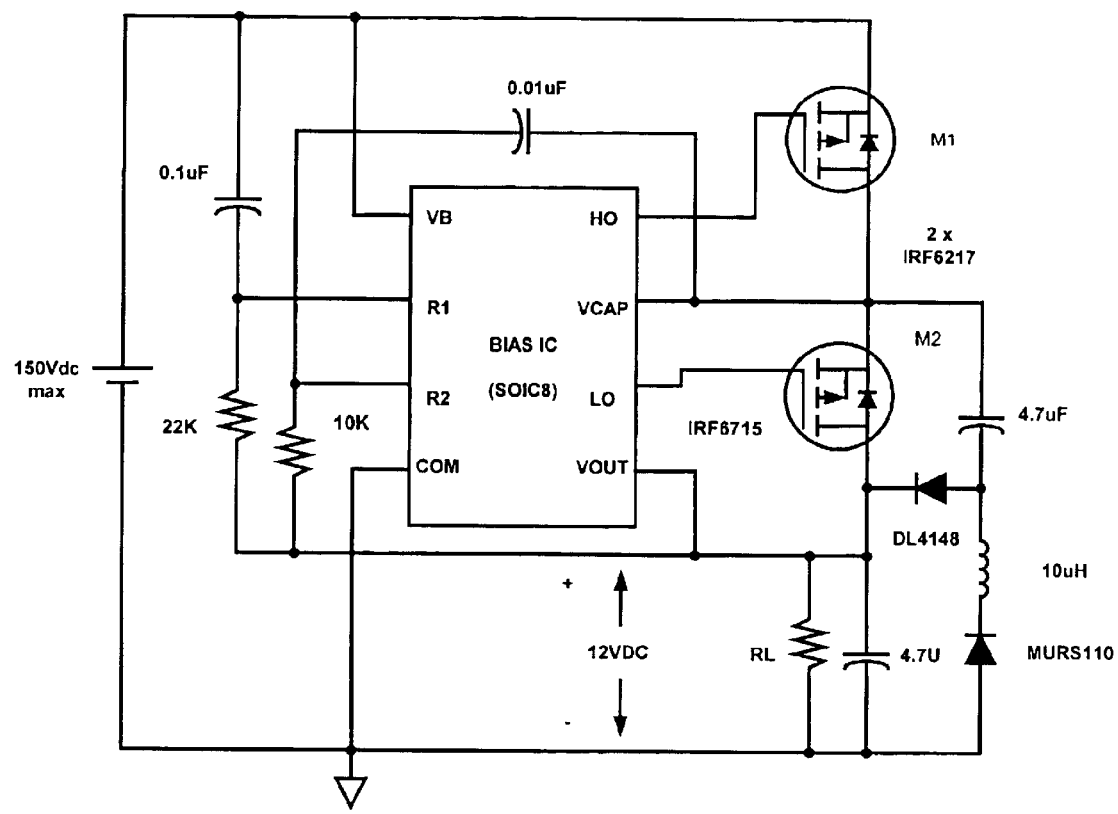

FIG. 11b shows a practical circuit using the Bias IC. The circuit consists of one SO8 controller, one SO8 dual P-channel HEXFET assembly 30 such as the IRF6217 (FIG. 11a), two diodes and six passive components generating a 12 Vdc output in circuits with up to 150V input voltage, and delivering up to 2.2 Watts of power.

Bench tests

A prototype circuit was built on the bench to verify the control operation of the foregoing circuit. Several aspects of the design were investigated.

Verification of maximum frequency/minimum discharge pulse width range

The graphs in FIG. 12 depict measured results on a prototype of the output stage. Graphs show the maximum frequency required to produce the output voltage with a minimum discharge pulse of ~400 nsec over a wide range of output load for a few input voltages. As the load changed the frequency was increased to maintain the output voltage constant. The graphs show that in some instances, the maximum frequency of 250 kHz was not adequate to maintain the output voltage level, forcing a wider discharge pulse.

Output stage efficiency

Figure 13:
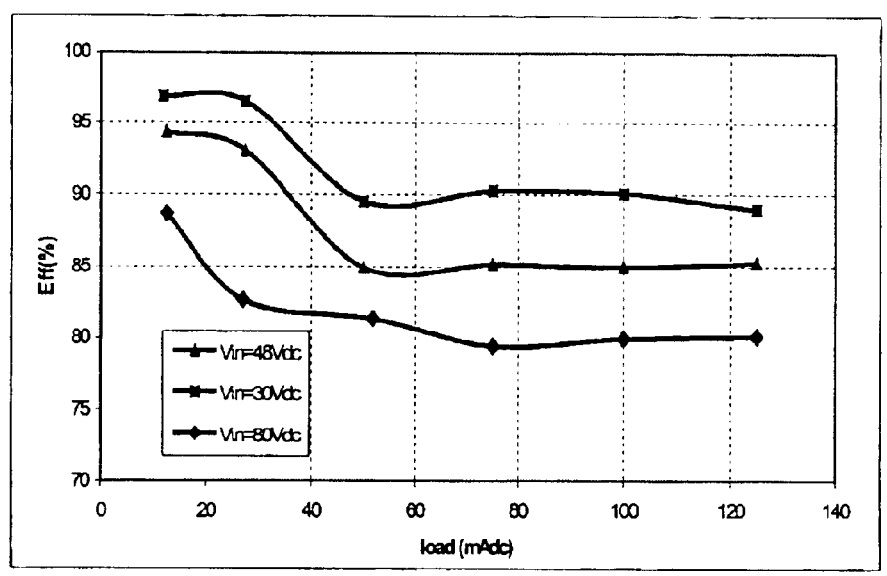
FIG. 13 is a graph showing efficiency versus load current for various input voltages.

The graph in FIG. 13 shows the efficiency of the output stage over load current, controller losses not being included. The inclusion of the inductor in the discharge path greatly reduces the losses associated with M2.

Inclusion of controller losses will reduce the overall efficiency to 65~70%.

Figure 14A:
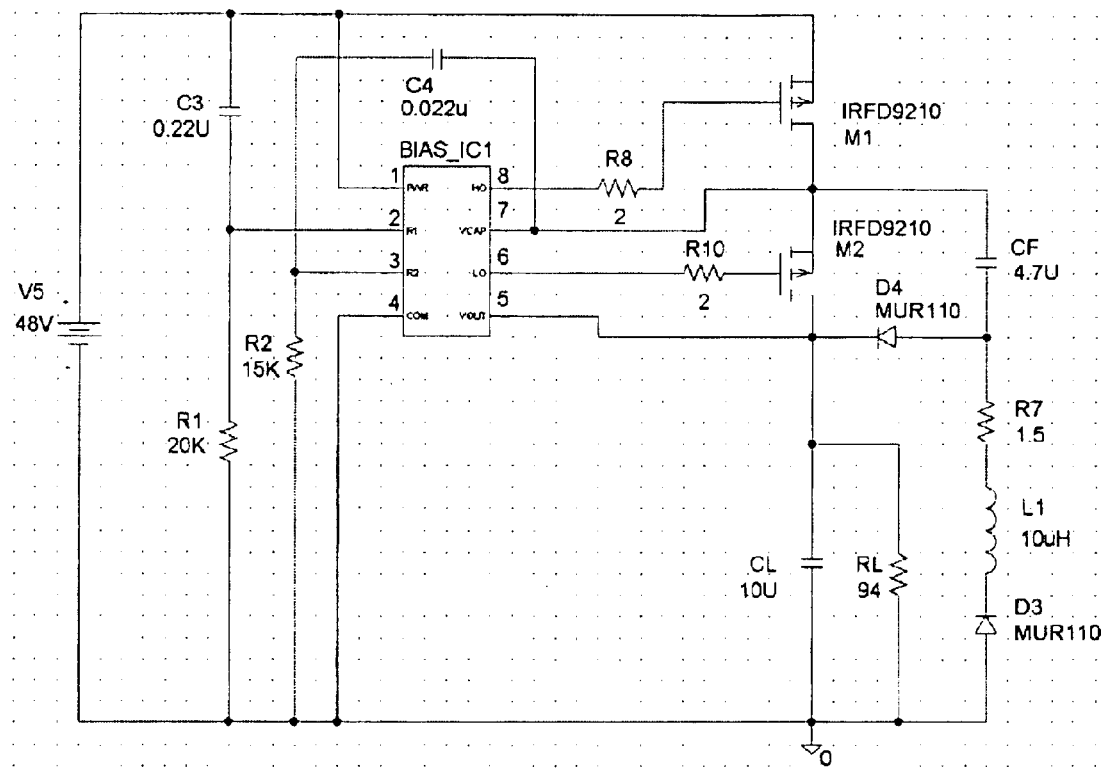

A simulation was performed using the circuit of FIG. 14a. The loss distribution in the circuit is shown in FIG. 14b.

Figure 14B:
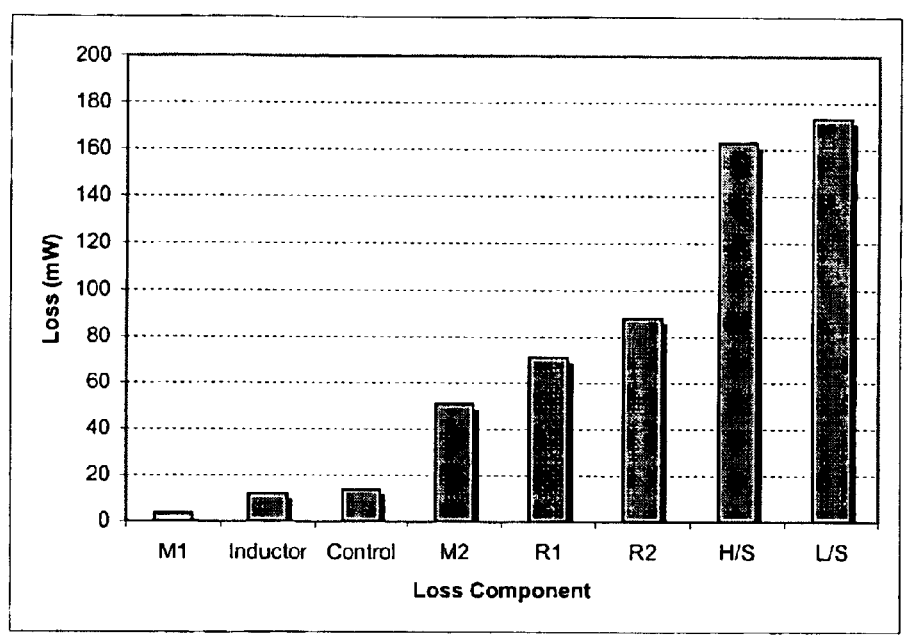

As is evident from FIG. 14b, the major loss components in this system are the high and low side drivers. These losses include switching (gate charge) losses as well as quiescent losses of both wells. Next, R1 and R2 are calculated to provide the current required to drive the external HEXFETS. These two bias resistors are calculated using the minimum expected input voltage and the maximum total gate charge required by each HEXFET using the following equations:

$$R1=(Vin(min)-Vz(\text{High side})/(fmax.Qg)$$

$$R2=(Vin(min)-Vz(\text{Low side})-Vout)/(fmax.Qg)$$

As an example, consider the following conditions:
Vin(min)=35 Vdc
Vz(Both high and low side)=10.4V (internal Zener in both floating wells)
Vout=12 Vdc
Qg–10 nC
Fmax=250 kHz Then maximum values for R1 and R2 become: R=10 Kohms R2=5.2 Kohms To increase the efficiency of the system several external and internal steps can be taken. Among them are:

Reduce gate drive requirements by using lower gate charge HEXFETs. This will also increase the size of R1 and R2 (less current is needed) hence increasing the efficiency even more.

Increase lowest operating voltage. This will increase R1 and R2 values and result in better efficiency at nominal operating voltages.

Operate high and low side level shifts at a reduced voltage (reduce losses by lowering fmax.Qg.Vgs power requirement), including lower threshold HEXFETS.

Use lower maximum operating frequency (150 kHz instead of 250 kHz)

Note that increasing the inductor value will not always result in improved efficiency, since the lower CF discharge capability will force the frequency to increase, which will increase the power losses in the high and low side wells considerably.

Switch Drive and Input current waveforms

Figure 15A:
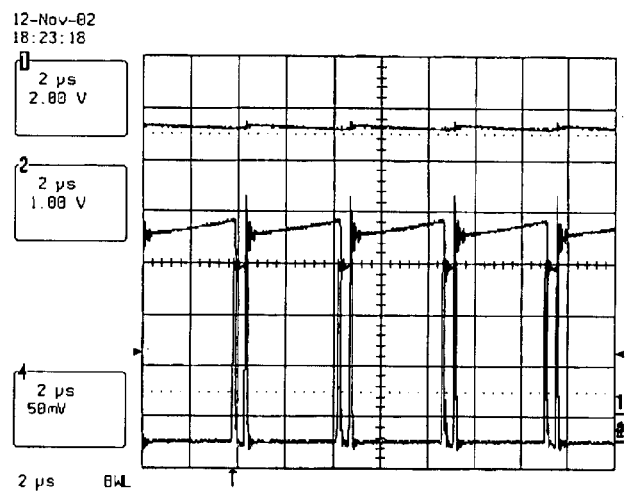
Figure 15B:
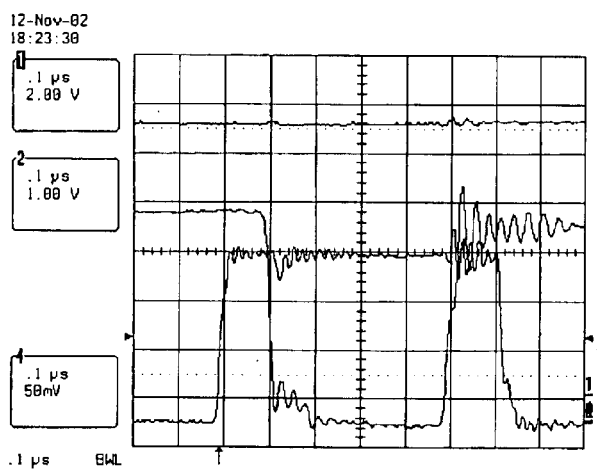
Figure 15C:
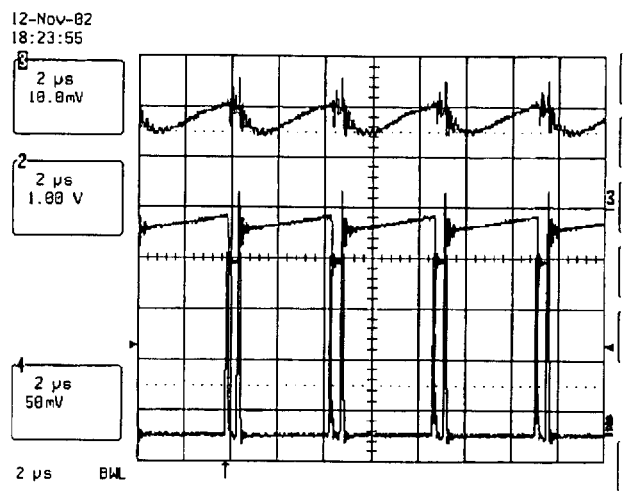

FIGS. 15a, 15b and 15c show some actual waveforms obtained from the prototype. FIG. 15a shows M1 and M2 gate waveforms (expanded in FIG. 15b). FIG. 15c shows the resulting low EMI input (supply) current. The waveforms were obtained at Vin=48 Vdc, Vout=11.5 Vdc with a 100 ohm load.

Performance and Protection

Output ripple of the bias IC highly depends on the load capacitance. High operating voltages will require higher values of output capacitance to provide current to the load since operating frequency will be fairly low.

Output overvoltage protection is accomplished by an internal 15 Vdc Zener diode. This diode also protects the load from overvoltage during start-up.

Short circuit protection is inherent to the bias-ic. If the load is shorted, forcing Vout below the undervoltage lockout of the control circuitry, the circuitry will cease to operate, thereby shutting down the entire system. A system power down and a subsequent power up will reset the output to its nominal value.

Alternate Configurations

Figure 16:
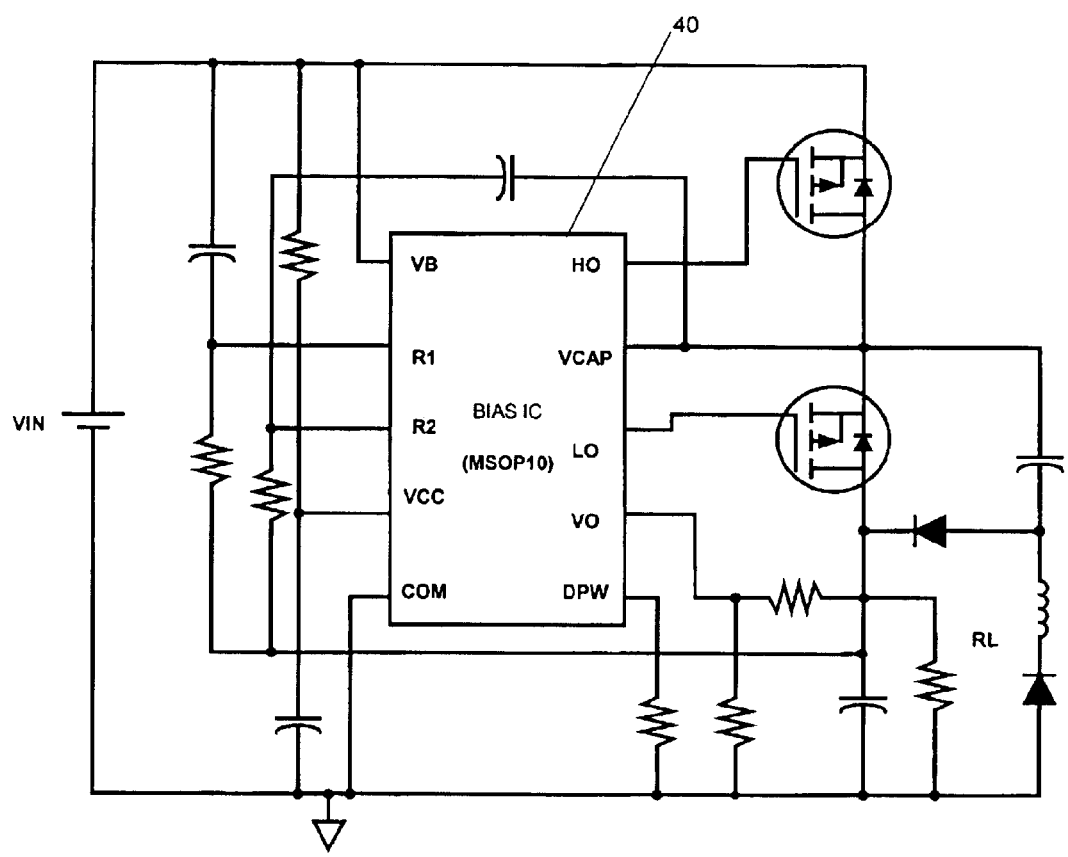
FIG. 16 is a schematic diagram of a second embodiment of the invention having a modified control IC.

Several alternative solutions can also be realized with the Bias IC. FIG. 16 shows one such solution. In this circuit the Bias IC 40 is housed in a 10 pin MSOP with two additional control pins DPW and VO available externally. The DPW pin is connected to a resistor network so as to set the minimum discharge pulse to other than 400 nsec. The VO pin is connected to a resistor network so as to program the output voltage to a value other than 12 Vdc.

Bias IC with N Channel HEXFETS

Figure 17:
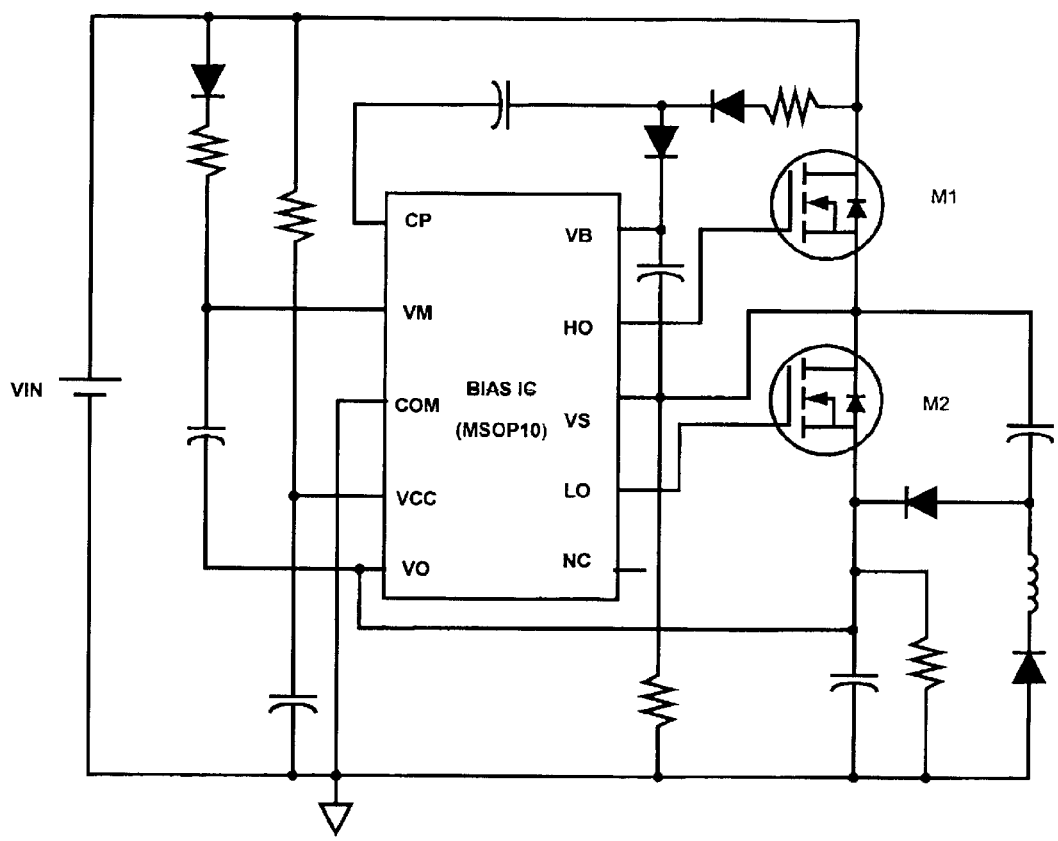
FIG. 17 is a schematic diagram of a third embodiment of the invention including N-channel HEXFETs.

With a short discharge pulse the duty cycle of M1 is considerably higher than M2. This means that M1 is on most of the time. In the p-channel implementation above, the gate voltage required to turn M1 on is less than the input bus voltage. Maintaining N-channel HEXFET's on will require a voltage on the gate that is higher than the bus voltage. This is not a major issue in applications where M1 and M2 are switched on and off at a fairly equal rate. Bootstrap diodes and capacitors have been used successfully to implement this. However, in the case of the Bias IC, the short discharge time (and low frequency at low loads) may not allow the bootstrap capacitor to be charged properly to maintain a constant Vgs on the switch without increasing EMI. As such, a different scheme needs to be adopted. The n-channel version depicted in FIG. 17 uses a charge pump to transfer the power required by the high side well to the bootstrap capacitor. This scheme, although functional, requires more components and increases the cost.

High voltage applications

Figure 18:
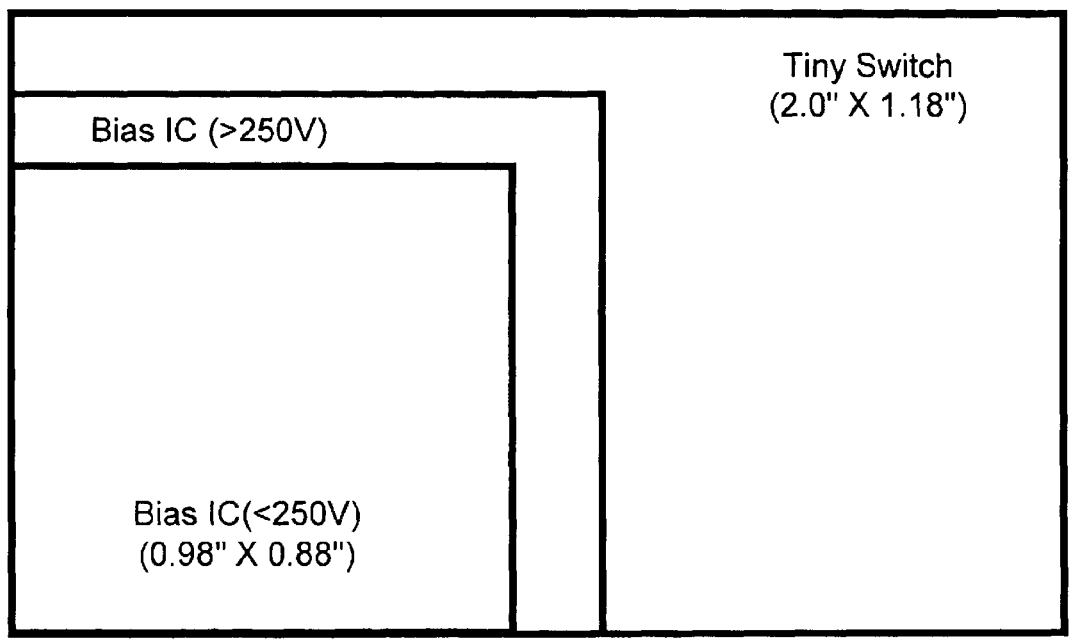
FIG. 18 is a comparison of the respective footprints of various IC packages.

The SO8 package allows for operation of the Bias IC up to 250 Vdc. Higher voltages will require extra pin spacing to meet the creepage requirements. Assembling the Bias IC in SO-14 will allow the system to be used at input voltages higher than 250 Vdc. (See FIG. 18.) The same is also true for the switches. Two HEX1/400V Pchannel (IRFRU9310) die can be assembled in the SO-14 split lead frame package for this application.

Lower Cost Configuration

Figure 19:
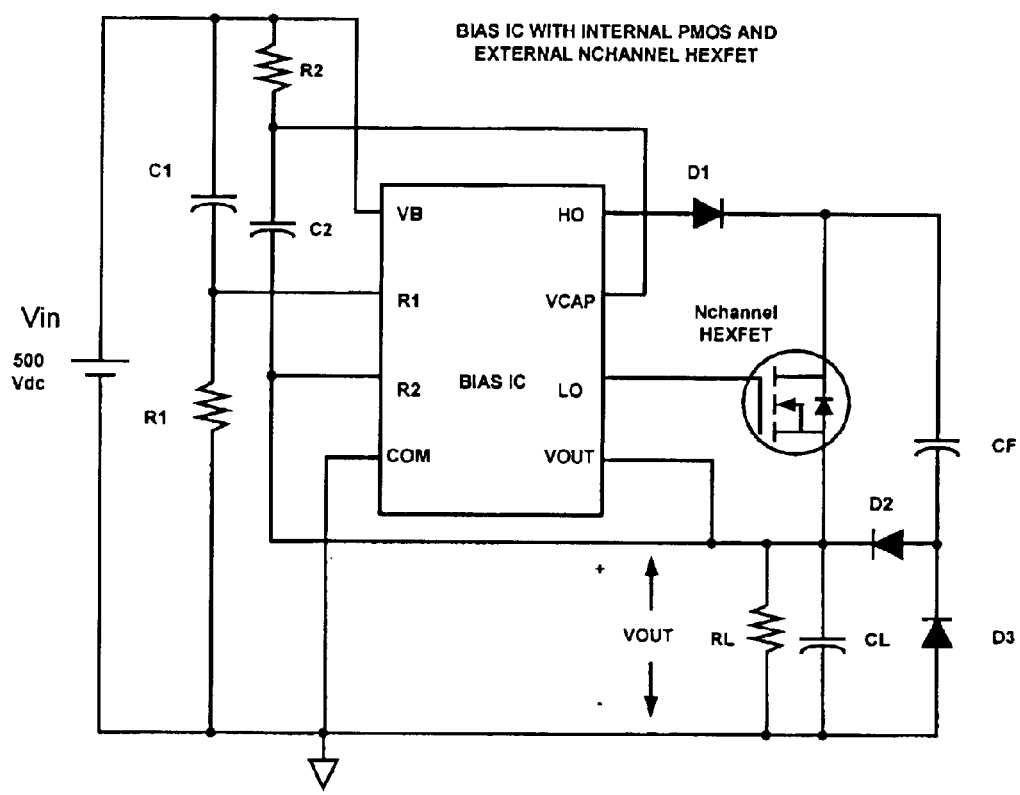
FIGS. 19 and 20 are respectively a schematic diagram and a block diagram of a fourth embodiment of the invention.
Figure 20:
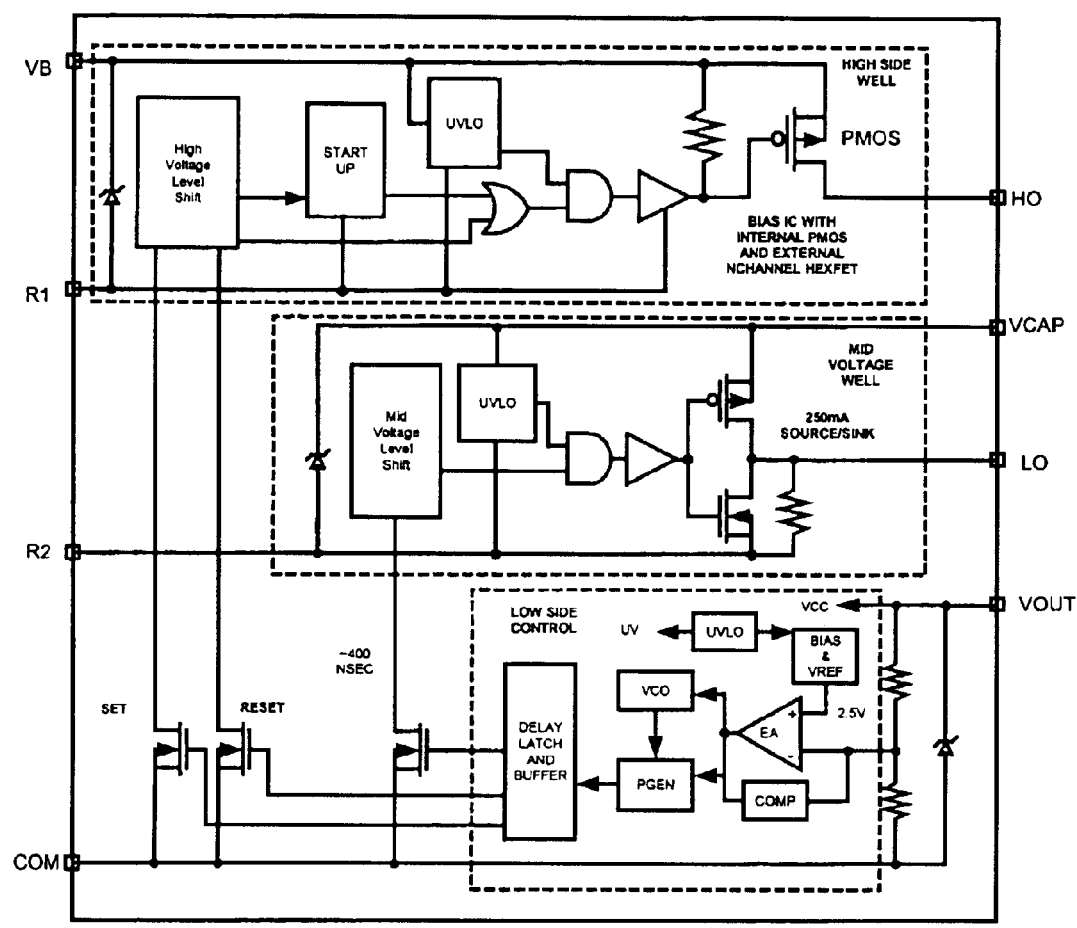

In the version shown in FIGS. 19 and 20, one external P-channel HEXFET has been eliminated and replaced with internal 500V PMOS (Rdson ~100 Ohm). This results in a lower cost system. Also, an external high voltage diode has been added in series with the internal PMOS output to prevent PMOS body diode (and hence, substrate) conduction. Further, the second external P-channel HEXFET has been replaced with an external 500V N-channel HEXFET.

These features allow a mid-voltage well to be biased a fixed voltage above Vout, eliminating high to low voltage swings of the well, hence eliminating the need for dV/dt protection. Signal transfer from the low side to the mid-voltage well is also simplified since the mid-voltage well is only 10 Vdc above Vout (Max voltage 30 Vdc, with overshoot) which eliminates any need for set and reset pulses between the low side control and mid-voltage well. The discharge signal is simply transferred with a single high voltage NMOS between the low side control and mid-voltage well (~400 nsec pulse). The circuit also requires less silicon since the mid-side well does not require a full 600V termination structure. A simple isolation diffusion (with a channel stop poly ring, for example) is adequate to hold the voltage. FIGS. 19 and 20, respectively, show the new circuit usage and its block diagram.

The control methodology and the timing diagrams presented above are applicable to the circuit of FIGS. 19–20. A current-limiting component may also be provided as described above.

Although the present invention has been described in relation to particular embodiments thereof, many other variations and modifications and other uses will become apparent to those skilled in the art. Therefore, the present invention is not limited by the specific disclosure herein.

What is claimed is:

1. A switched-capacitor converter comprising:

a supply voltage input for receiving a supply voltage;

an output circuit comprising a load resistance and a load capacitance connected in parallel;

a diode circuit comprising a first diode and a second diode connected in series at a diode junction point, said diode circuit being connected in parallel with said output circuit;

first and second semiconductor switches connected in series at a switch junction point; said semiconductor switches being connected between said supply voltage input and said output circuit; and a flying capacitance connected between said switch junction point and said diode junction point;

wherein said load capacitance is charged via said flying capacitance and said second diode when said first switch is ON and said second switch is OFF, and said load capacitance is discharged via said first diode and said flying capacitance when said first switch is OFF and said second switch is ON.

2. The converter of claim 1, wherein each said semiconductor switch includes a p-channel MOSFET.

3. The converter of claim 1, wherein each said semiconductor switch includes an n-channel MOSFET.

4. The converter of claim 1, further comprising a current limiting component in series with at least one of said first diode, said flying capacitor, said second switch and said output circuit.

5. The converter of claim 4, wherein said current limiting component is an inductance.

6. The converter of claim 4, wherein said current limiting component is disposed between said first diode and said diode junction point.

7. The converter of claim 6, wherein said current limiting component is an inductance.

8. The converter of claim 1, further comprising a control IC for controlling said first and second semiconductor switches, said control IC comprising:

a high side well powered by said input supply voltage and including a first driver circuit connected for driving said first semiconductor switch;

a floating well powered by said flying capacitor and including a second driver circuit connected for driving said second semiconductor switch; and a control circuit powered by an output voltage across said output circuit.

9. The converter of claim 8, wherein, at a start-up time, said control circuit charges said load capacitance to a predetermined initial voltage.

10. The converter of claim 9, wherein said control circuit controls said first semiconductor switch to charge said flying capacitance and thereby charge said load capacitance to said predetermined initial voltage.

11. The converter of claim 8, wherein said control circuit delivers a variable amount of charge to said load capacitance per unit time.

12. The converter of claim 11, wherein said control circuit increases a discharge frequency in response to an increase in load power demand, and maintains a predetermined fixed discharge time.

13. The converter of claim 12, wherein, when said discharge frequency reaches a predetermined maximum, the control circuit maintains said maximum frequency and increases the discharge time in response to an increase in load power demand.

14. The converter of claim 11, wherein, when said discharge frequency reaches a predetermined maximum, the control circuit maintains said maximum frequency and increases the discharge time in response to an increase in load power demand.

15. A switched-capacitor converter comprising:

a supply voltage input for receiving a supply voltage;

an output circuit comprising a load resistance and a load capacitance connected in parallel;

a diode circuit comprising a first diode and a second diode connected in series at a diode junction point, said diode circuit being connected in parallel with said output circuit;

first and second semiconductor switches connected in series at a switch junction point; said semiconductor switches being connected between said supply voltage input and said output circuit; and a flying capacitance connected across said second semiconductor switch and to said diode junction point;

wherein said load capacitance is charged via said flying capacitance and said second diode when said first switch is ON and said second switch is OFF, and said load capacitance is discharged via said first diode and said flying capacitance when said first switch is OFF and said second switch is ON.

16. The converter of claim 15, wherein said first and second semiconductor switches are interconnected by a third diode, said flying capacitor being connected to said diode connection point of said first and second diodes, and to a connection point between said third diode and said second semiconductor switch.

17. The converter of claim 15, further comprising a control IC for controlling said first and second semiconductor switches, said control IC comprising:
   a high side well powered by said input supply voltage and including a first driver circuit connected for driving said first semiconductor switch;
   a floating well powered by said flying capacitor and including a second driver circuit connected for driving said second semiconductor switch; and
   a control circuit powered by an output voltage across said output circuit.

18. The converter of claim 17, wherein, at a start-up time, said control circuit charges said load capacitance to a predetermined initial voltage.

19. The converter of claim 18, wherein said control circuit controls said first semiconductor switch to charge said flying capacitance and thereby charge said load capacitance to said predetermined initial voltage.

20. The converter of claim 17, wherein said control circuit delivers a variable amount of charge to said load capacitance per unit time.

21. The converter of claim 20, wherein said control circuit increases a discharge frequency in response to an increase in load power demand, and maintains a predetermined fixed discharge time.

22. The converter of claim 21, wherein, when said discharge frequency reaches a predetermined maximum, the control circuit maintains said maximum frequency and increases the discharge time in response to an increase in load power demand.

23. The converter of claim 20, wherein, when said discharge frequency reaches a predetermined maximum, the control circuit maintains said maximum frequency and increases the discharge time in response to an increase in load power demand.

24. The converter of claim 20, wherein said first semiconductor switch is comprised in said first driver.

25. The converter of claim 24, wherein said first semiconductor switch includes a PMOS.

26. The converter of claim 25, wherein said second semiconductor switch includes an n-channel MOSFET.

27. The converter of claim 24, wherein said second semiconductor switch includes an n-channel MOSFET.

28. The converter of claim 15, wherein said first and second semiconductor switches are p-channel and n-channel devices, respectively.

29. A control IC for controlling first and second semiconductor switches in a switched-capacitor converter comprising:
   a supply voltage input for receiving a supply voltage;
   an output circuit comprising a load resistance and a load capacitance connected in parallel;
   a diode circuit comprising a first diode and a second diode connected in series at a diode junction point, said diode circuit being connected in parallel with said output circuit;
   first and second semiconductor switches connected in series at a switch junction point; said semiconductor switches being connected between said supply voltage input and said output circuit; and
   a flying capacitance connected across said second semiconductor switch and to said diode junction point;
   wherein said load capacitance is charged via said flying capacitance and said second diode when said first switch is ON and said second switch is OFF, and
   said load capacitance is discharged via said first diode and said flying capacitance when said first switch is OFF and said second switch is ON;
   said control IC comprising:
   a high side well powered by said input supply voltage and including a first driver circuit connected for driving said first semiconductor switch;
   a floating well powered by said flying capacitor and including a second driver circuit connected for driving said second semiconductor switch; and
   a control circuit powered by an output voltage across said output circuit.

30. The control IC of claim 29, wherein, at a start-up time, said control circuit charges said load capacitance to a predetermined initial voltage.

31. The control IC of claim 30, wherein said control circuit controls said first semiconductor switch to charge said flying capacitance and thereby charge said load capacitance to said predetermined initial voltage.

32. The control IC of claim 29, wherein said control circuit delivers a variable amount of charge to said load capacitance per unit time.

33. The control IC of claim 32, wherein said control circuit increases a discharge frequency in response to an increase in load power demand, and maintains a predetermined fixed discharge time.

34. The control IC of claim 33, wherein, when said discharge frequency reaches a predetermined maximum, the control circuit maintains said maximum frequency and increases the discharge time in response to an increase in load power demand.

35. The control IC of claim 32, wherein, when said discharge frequency reaches a predetermined maximum, the control circuit maintains said maximum frequency and increases the discharge time in response to an increase in load power demand.

36. The control IC of claim 29, wherein said first and second semiconductor switches are interconnected by a third diode, said flying capacitor being connected to said diode connection point of said first and second diodes, and to a connection point between said third diode and said second semiconductor switch.

37. The control IC of claim 29, wherein said first and second semiconductor switches are connected to each other directly.

* * * * *